(12) United States Patent
Nelson

(10) Patent No.: US 7,484,697 B1
(45) Date of Patent: Feb. 3, 2009

(54) UNIVERSAL STRUT END CLAMP

(76) Inventor: Timothy Andrew Nelson, 1146 Kenilworth Ave., Napoleon, OH (US) 43545

( * ) Notice: Subject to any disclaimer, the term of this patent is extended or adjusted under 35 U.S.C. 154(b) by 150 days.

(21) Appl. No.: 11/085,358

(22) Filed: Mar. 21, 2005

(51) Int. Cl.
 *E21F 17/02* (2006.01)
(52) U.S. Cl. ............................ 248/62; 248/58; 248/68.1
(58) Field of Classification Search .............. 52/506.03, 52/507, 704, 707, 698, 73, 223.4, 223.8, 52/223.13, 1, 161, 706, 710; 248/56, 58, 248/61–62, 68.1, 71, 231.91, 231.9; D25/126; 211/193, 205
See application file for complete search history.

(56) References Cited

U.S. PATENT DOCUMENTS 2,880,949 A * 4/1959 Fuss ............................ 248/70
3,420,013 A * 1/1969 Alvarado ...................... 52/161
5,660,013 A * 8/1997 Saldarelli et al. .............. 52/296
6,973,755 B2* 12/2005 Pott ........................... 52/223.8

* cited by examiner

*Primary Examiner*—Gwendolyn Baxter

(57) ABSTRACT

A universal strut clamping device preferably made from steel components and is utilized as a load bearing support for conduits and the like. This clamping device, which is always used in pairs, is comprised of a single baseplate with an attached strut locating guide and further including an aperture for a longitudinally installed threaded rod which will be used to attach to a building member and further compress a preformed metallic strut between each clamping device. The versatility of this support allows the installer the options of attaching the strut bracket rigidly to a wall, floor or ceiling in a cantilever configuration, or suspending it from a building structure by a single threaded rod as a vertical trapeze.

2 Claims, 6 Drawing Sheets

UNIVERSAL STRUT END CLAMP

BACKGROUND OF THE INVENTION

1. Field of Invention

The present invention relates generally to a strut support, and more specifically it relates to a universal strut end clamp for a simple and cost effective means of installing piping and equipment supports utilizing readily available strut in commercial and industrial construction.

2. Prior Art

It can be appreciated that conduit supports utilizing strut have been in use for several years. It is common in commercial and industrial construction to group conduits and piping so they generally extend parallel with each other for relatively long distances in or close to the same plane. A typical pipe supporting structure, commonly referred to as a trapeze, based on its appearance, consists of at least two threaded rods spaced apart from each other and extending downward from an overhead structure and an angle iron or strut attached near the lower end thereof to be held in a horizontal position. The bar must be strong enough to allow several pipes to be supported on it, or suspended from it, without appreciably bending in response to the combined weight of the pipes and the conductors or liquid encased by them. It is also important that the individual piping be held in fixed selected locations on the horizontal member, which is accomplished by individual pipe clamping devices.

The problems associated with a conventional trapeze strut support are that additional labor and material are required to build the support and at least two points of attachment to the building structure are required, which invariably drives the installed cost higher. Another problem with conventional strut supports is that a tradesman is required to have in immediate stock, several different types of brackets and hardware items to attach piping or conduit to the building structure, including floor, wall and ceiling surfaces. Still another problem with conventional strut supports, welding or additional hole drilling of the support member is typically required to support several piping members to a single support. While these devices may be suitable for the particular purpose to which they address, they are not as suitable for a simple and cost effective means of installing mechanical and electrical piping systems utilizing commonly available strut and hardware.

In these respects, the universal strut end clamp, a load bearing supporting device, according to the present invention, substantially departs from the conventional concepts and designs of the prior art, and in so doing, provides an apparatus primarily developed for the purpose of a simple and cost effective means of installing mechanical and electrical supports utilizing readily available strut and common hardware.

OBJECTS AND ADVANTAGES

In view of the foregoing disadvantages inherent in the known types of strut supports now present in the prior art, the present invention provides a new end clamp assembly for strut, wherein the same can be utilized for a simple and cost effective means of installing mechanical and electrical supports utilizing readily available strut.

The general purpose of the present invention, which will be described subsequently in greater detail, is to provide a new universal strut end clamp assembly that has many of the advantages of the strut supports mentioned heretofore and many novel features that result in a new universal strut end clamp system which is not anticipated, rendered obvious, suggested, or even implied by any of the prior art, either alone or in any combination thereof.

To attain this, the present invention, which is always used in pairs, are individually comprised of a single baseplate cut to a predetermined length depending on the number of struts to be utilized and a locating guide for each strut. The locating guide of the preferred embodiment is a circular steel component substantially attached to the baseplate to form a single clamping assembly. A single aperture in each baseplate is made to allow a threaded rod to pass longitudinally through the strut and the pair of strut end clamp assemblies. This combination of baseplate and locating guide used in conjunction with readily available strut will have the ability to replace several known strut supports commonly used in commercial and industrial construction.

There has thus been outlined, rather broadly, the more important features of the invention in order that the detailed description thereof may be better understood, and in order that the present contribution to the art may be better appreciated. Additional features of the present invention will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

The principle objective of the present invention is to provide a piping support, utilizing strut, which can be attached as an assembly to the structural members of a building, including walls, floors or ceilings, utilizing a single threaded rod to provide stable means of convenient length and sufficient strength to carry a number of parallel or perpendicular pipes. In all cases, only a single point of attachment is required to fasten the strut support assembly to the structural members of a building.

A primary object of the present invention is to provide a strut support that will overcome the shortcomings of the prior art trapezes, which are typically supported by a plurality of support members and are not rigidly attached to the building structure which allows for undesired movement of the conduit and piping systems.

Another object is to provide a universal strut end clamp that allows for the attachment of multiple struts utilizing one clamping mechanism and one single anchor point to the building structure. Although this invention primarily deals with using one or two struts per clamping assembly, it is possible to configure one clamp assembly to consist of up to four struts. These four struts could be installed with the channel openings open to all four sides which would give maximum versatility for parallel and perpendicular pipes without welding or purchasing pre-welded strut configurations.

Another object is to provide a universal strut end clamp that permits one or more struts to be attached vertically and perpendicular to a floor surface by a single attachment means. This configuration would allow for mounting of disconnect switches, control panels and other related equipment in a vertical orientation as desired at the work site. This method of installation would be preferable over existing means of support, which require welding or the use of costly brackets and additional hardware.

Another object is to provide a method that prevents strut pipe clamps from sliding out of the strut when mounted in a vertical orientation. In a typical vertical strut application, conduits are clamped individually to the strut. If a pipe clamps threaded fastener were to vibrate loose, the conduit could fall, possibly causing component failure or property damage. Typically this could be avoided by installing a nut and bolt at the end of the strut. This would add to the labor required for the installation, but would be inherent with the present invention.

Another object is to provide a strut support that eliminates the need to file or grind the sharp edges of the strut prior to installation. Strut is typically field cut at the job site, utilizing a bandsaw or abrasive cut-off saw. This type of cut leaves dangerous sharp edges for the installer and for the customer. Accepted practice is the time consuming filing or grinding smooth of these edges to prevent safety issues. Since all of the exposed ends of the strut are contained by the present invention, the time consuming job of finishing the exposed edges is not necessary.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

SUMMARY OF THE INVENTION

The present invention is directed to a universal strut clamping device which is preferably made from steel components. This clamping device, which is always used in pairs, is comprised of a single baseplate with an attached strut locating guide and further including an aperture for a threaded rod which will be used to attach to a building member and also compress a preformed metallic strut between each clamping device. The versatility of this invention allows the installer the options of attaching the strut bracket rigidly to a wall, floor or ceiling, or suspending it from a single threaded rod as a vertical trapeze.

BRIEF DESCRIPTION OF THE DRAWINGS

Various other objects, features and attendant advantages of the present invention will become fully appreciated as the same becomes better understood when considered in conjunction with the accompanying drawings, in which like reference numerals designate the same or similar parts throughout the several views, and wherein.

DRAWINGS

Reference Numerals

Figure 1:
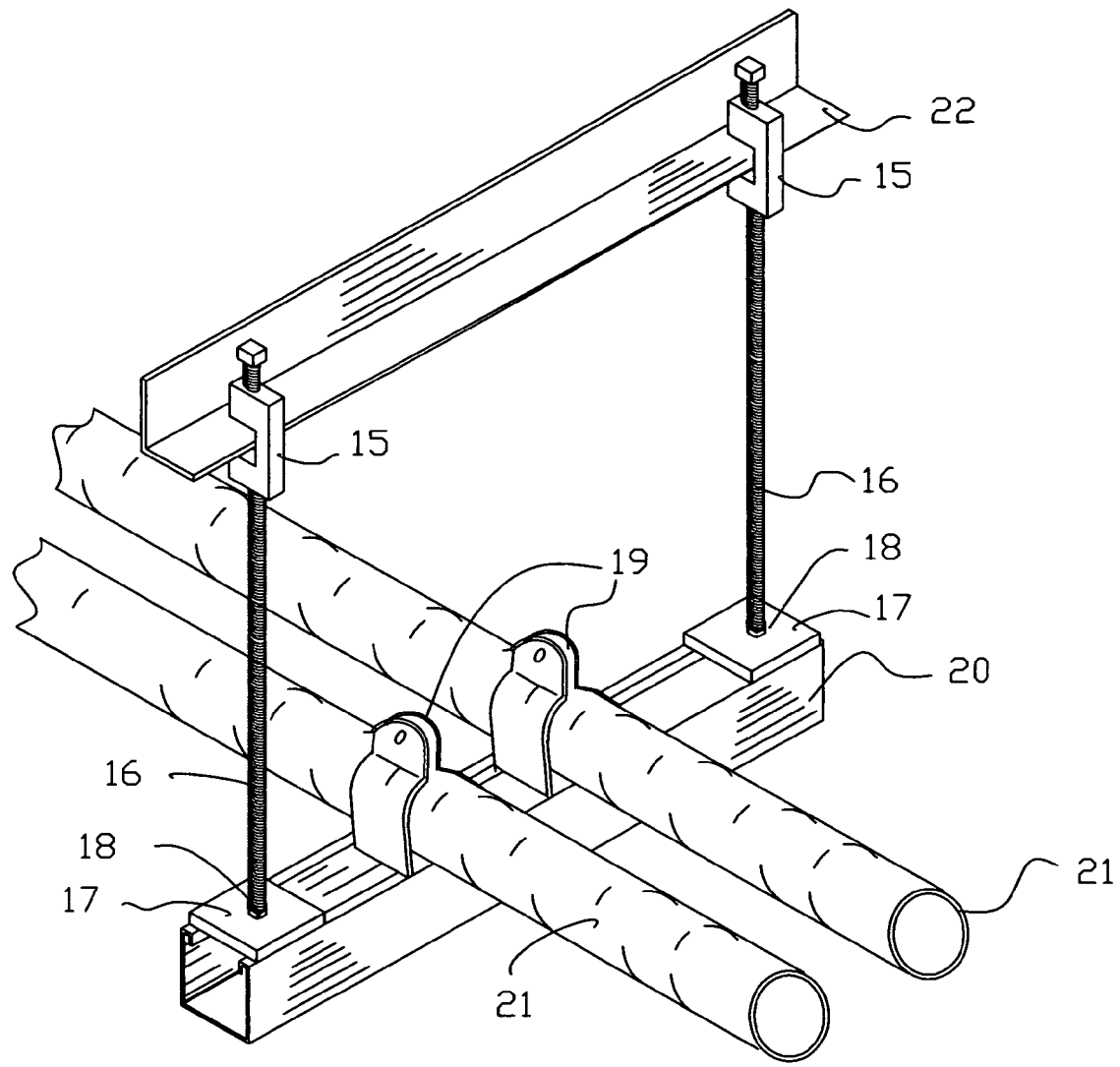
FIG. 1 is a perspective view of one of many prior art trapeze type piping hangers currently in use.

| | |
|---|---|
| 11. | Locating Guide |
| 12. | Baseplate Notch |
| 13. | Concrete Surface |
| 14. | Concrete Stud Anchor |
| 15. | Beam Clamp |
| 16. | Threaded Rod |
| 17. | Square Washer |
| 18. | Hex Head Nut |
| 19. | Strut Pipe Strap |
| 20. | Single Strut |
| 21. | Conduit |
| 22. | Angle Beam |
| 23. | Locating Guide with Notch |
| 24. | Flat Washer |
| 25. | Threaded Fastener |
| 26. | Concrete Expansion Anchor |
| 27. | Single Baseplate with Notch |
| 28. | Double Baseplate with Hole |
| 29. | Triple Baseplate |
| 30. | Single Clamp Assembly with Notch |
| 31. | Single Baseplate with Hole |
| 32. | Double Baseplate with Notch |
| 33. | Triple Baseplate with Notch |
| 34. | Baseplate Round Aperture |
| 35. | Double Clamp Assembly with Hole |
| 36. | Single Baseplate with Hole |
| 37. | Single Clamp Assembly with Hole |
| 38. | Drilled and Welded Baseplate |
| 39. | Double Clamp Assembly with Notch |
| 40. | Triple Clamp Assembly with Notch |
| 41. | Triple Baseplate with Notch |

DETAILED DESCRIPTION OF THE INVENTION

Turning now descriptively to the drawings, in which similar reference numerals denote similar elements throughout the several views, the attached figures illustrate prior art of various supports that are currently used in the construction trades. Additional figures depict several embodiments of this load bearing hanger bracket described as a universal strut end clamp. This invention is comprised of a single baseplate cut to a predetermined length depending on the number of struts to be utilized. Although the locating guide shown is a circular metallic component which is substantially attached to the baseplate to form a single clamping mechanism, other locating guide configurations are also possible.

Prior art FIG. 1 shows a typical strut trapeze (20) suspended from an angle iron beam (22) and supporting a plurality of parallel conduits (21) in one of the many ways known prior to this invention. In this embodiment, all of the conduits (21) happen to have the same diameter, but that is not always the case. In this instance, the support member (20) is a piece of preformed metallic strut, and the pipes are held in place by means of pipe clamping devices (19) to prevent movement of the pipes, either longitudinally or transversely. The trapeze strut (20) includes suspension means (16), which in this embodiment is comprised of threaded suspension rods, or all-threads (16). The upper ends of the rods are threaded into the beam clamps (15), and further clamped to the angle iron, while the lower ends are attached to the lower strut (20). The embodiment shown in FIG. 1 is only one of a virtually limitless variety of embodiments currently being utilized, and it illustrates only a few of the components that a tradesman constructing a piping support must have immediately available.

Figure 2:
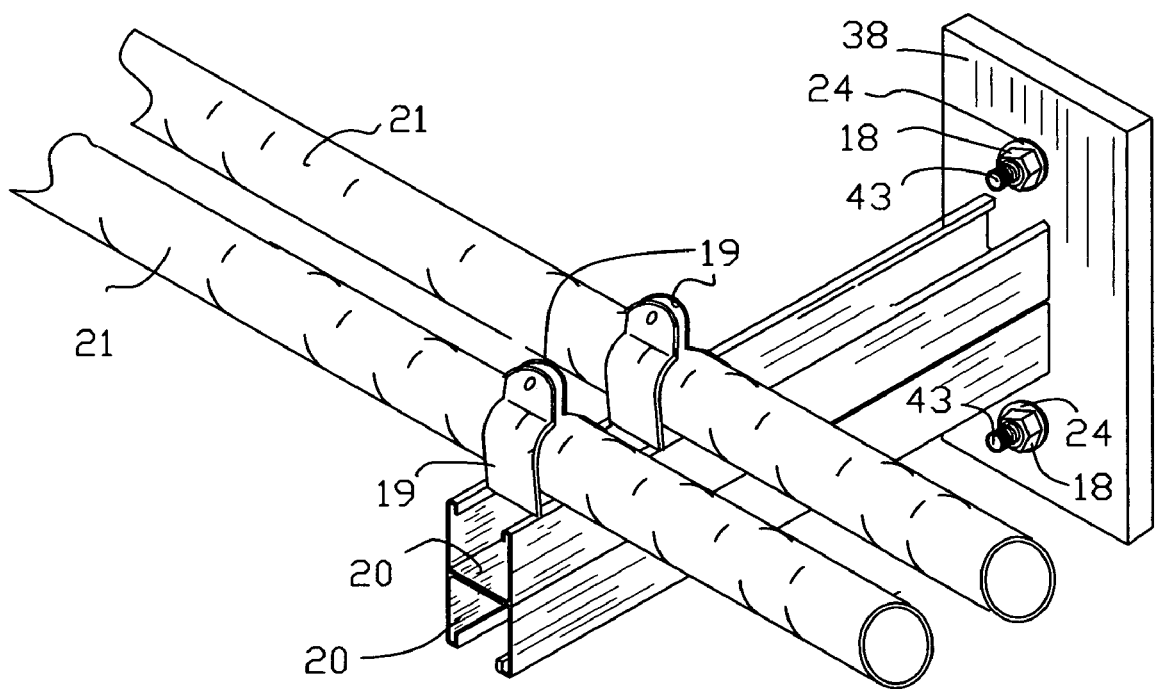
FIG. 2 is a perspective view of one of many cantilever baseplate piping hangers currently in use.

Additionally, prior art FIG. 2 shows a typical cantilever piping support, which is comprised of two individual struts (20) welded together and further welded to a steel baseplate (38). This cantilever support would be typically attached to a masonry surface utilizing no fewer than two anchoring devices (43) to attach to the building structure (23). In addition, this support would require field assembly, which would require the tradesman to weld the components at the work site and drill two holes in the masonry structure and set two concrete anchors. A piping support of this embodiment is very labor intensive, which significantly drives up the cost of installation.

Figure 3:
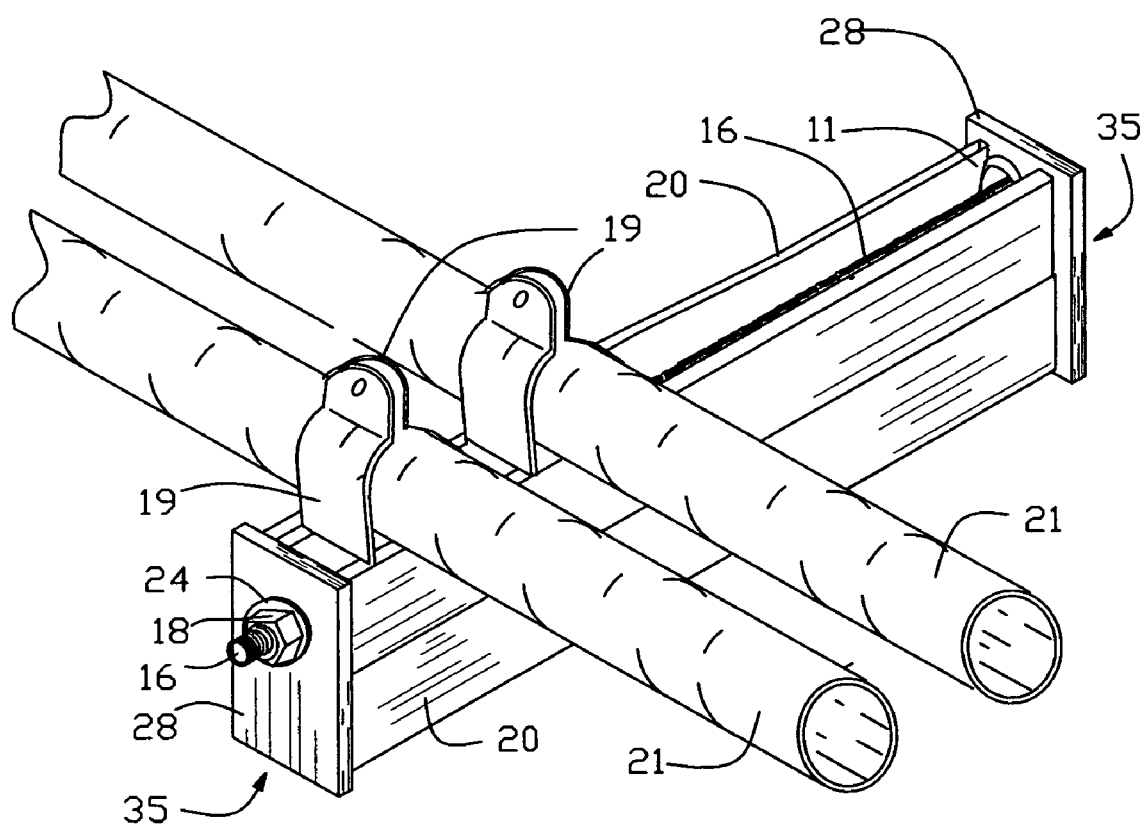
FIG. 3 is a perspective view of a double strut cantilever embodiment of the present invention.

A typical embodiment of the present invention is shown in FIG. 3 as a cantilevered support attached to a building structure surface. As shown in the figure, no welding or drilling is required and only one point of attachment to the building structure is necessary. The baseplate of the present invention (28) is comprised of a flat plate of sufficient length, width and thickness to support a singular or plurality of support members commonly referred to as strut (20). This baseplate is designed to support two individual hollow channel struts (20) with two circular locating guides (11) affixed to the individual baseplate. If more struts were to be utilized on a single baseplate, its dimensional parameters would be increased and additional locating guides would be added to allow for the additional struts. FIG. 3 further shows a perspective view of an embodiment of this universal strut clamp invention. This combined unit comprises two individual single struts (20) clamped together using two strut clamp assemblies (35) of the present invention. These two universal strut clamps (35) are required at opposite ends of the strut with a transversely installed threaded rod (16), threaded hex nut (18) and flat washer (14); the opposite end is further threaded into a concrete anchor to attach to a masonry building wall, floor or ceiling surface in this cantilever embodiment. A plurality of pipes (21) can then be supported from either side of the struts and fastened securely utilizing strut pipe clamps (19).

Figure 4:
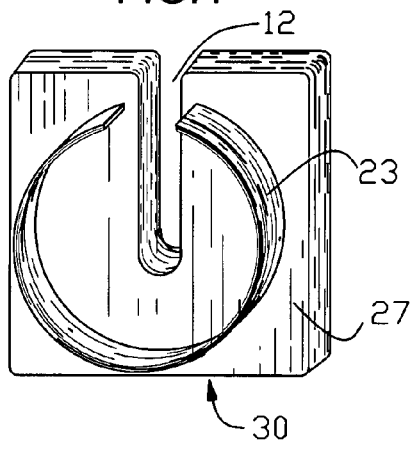
FIG. 4 is a perspective view of the present invention for a single strut depicting a notched aperture.

A perspective view of the simplest form of the present invention is shown in FIG. 4. In this embodiment, a single notched aperture (12) in the baseplate (27) is depicted. The location and dimension of this aperture is based on the diameter of the threaded rod. As shown in FIG. 4, the locating guide (23) of the preferred embodiment is a metallic circular steel component which is attached to the baseplate to form a single clamping assembly (30). The locating guide (23), which will be substantially fastened to the baseplate (27), has a predetermined outside diameter which is determined by the inside dimensions of the strut to which it will be frictionally engaged. The length of the locating guide (23) will be of sufficient size to allow attachment to the baseplate and also will protrude into the strut to provide adequate support on the struts interior planar surfaces. This figure also depicts a single baseplate (27) and locating guide (23) as an assembly (30), which is shown with a machined notched aperture (12) that will allow the clamp assembly to be attached to a previously installed threaded rod. In accordance with the present invention, it will be desired to weld this locating guide (23) to the notched baseplate (27) as an assurance the finished mechanism forms a single clamping assembly (30). An optional embodiment would allow a circular relief cut into the baseplate and the locating guide would be pressed into the baseplate. This could possibly eliminate the need for welding the components composing this invention. Other possible variations of the locating guide could include a cross shape or "bat wing" configuration, or any other combination of clips to provide the locating of the hollow support member and additional strength of the support member. These alternative locating guides could be welded directly to the baseplate or could be entirely machined out of one piece of material to include both the locating guide and the baseplate to form a unitary device.

Figure 5:
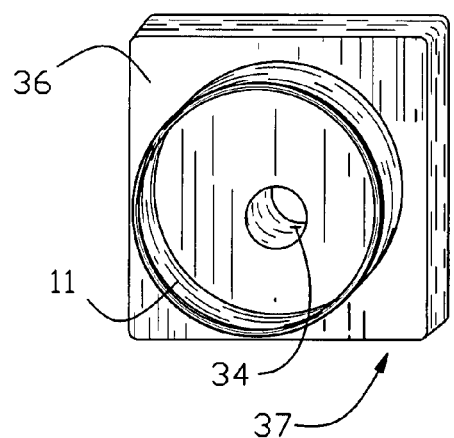
FIG. 5 is a perspective view of the present invention for a single strut depicting a round aperture.

Additionally, FIG. 5 depicts a similar embodiment of the present invention (37) with a round aperture (34) for attaching to a building member; however this embodiment would not be able to be installed on a previously installed threaded rod.

Figure 6:
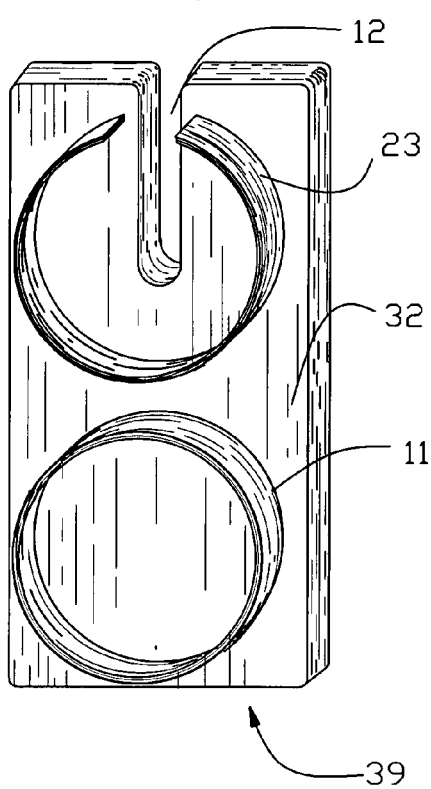
FIG. 6 is a perspective view of the present invention for two struts depicting a notched aperture.

FIG. 6 shows a perspective view of an embodiment of this invention to clamp two struts in a parallel fashion. This support includes a generally flat baseplate (32) in various lengths depending on the number of struts to support. Locating guides (11) (23) are welded to the baseplate to allow a strut to be rotated in any orientation based on the user's preference. Each locating guide (11)(23) is sized to allow individual struts (20) to be supported on each of its inside planar surfaces, utilizing each quadrant of the locating guide to prevent movement once clamped in position. Each baseplate has a single aperture (12) to accommodate a threaded rod to extend longitudinally through the strut and clamping devices to further attach to a building surface. An advantage of this embodiment, shown as a perspective exploded view in FIG. 10, which allows either strut (20) to be rotated about the locating guides to provide for either parallel or perpendicular support of the desired conduits or piping without the need for specialized strut configurations or additional welding.

Figure 7:
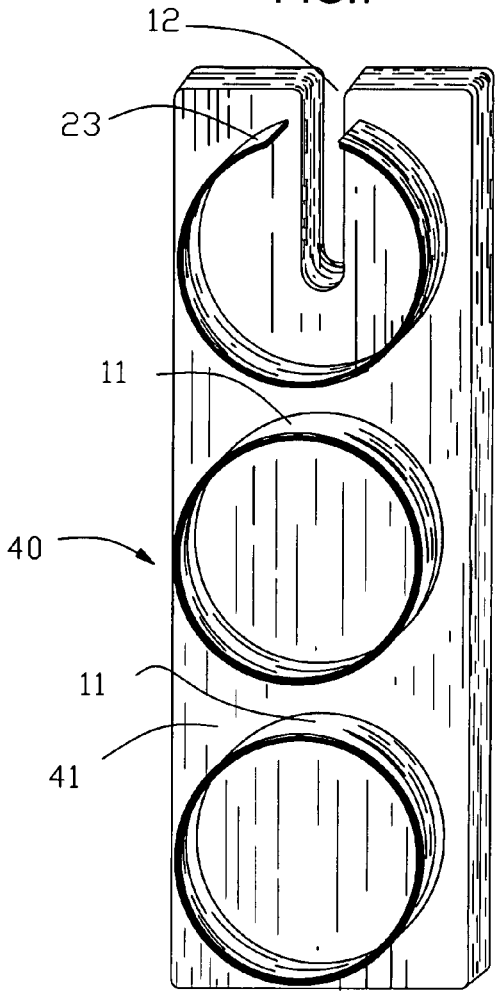
FIG. 7 is a perspective view of the present invention for three struts depicting a notched aperture.

FIG. 7 depicts a further embodiment utilizing three locating guides (23) (11) with a notched baseplate aperture (12). Although the aperture is shown within the top locating guide, a further embodiment could be desired in which the aperture is within the middle locating guide and the notched aperture would be located in either of the longer sides of the clamping assembly (40).

Figure 8:
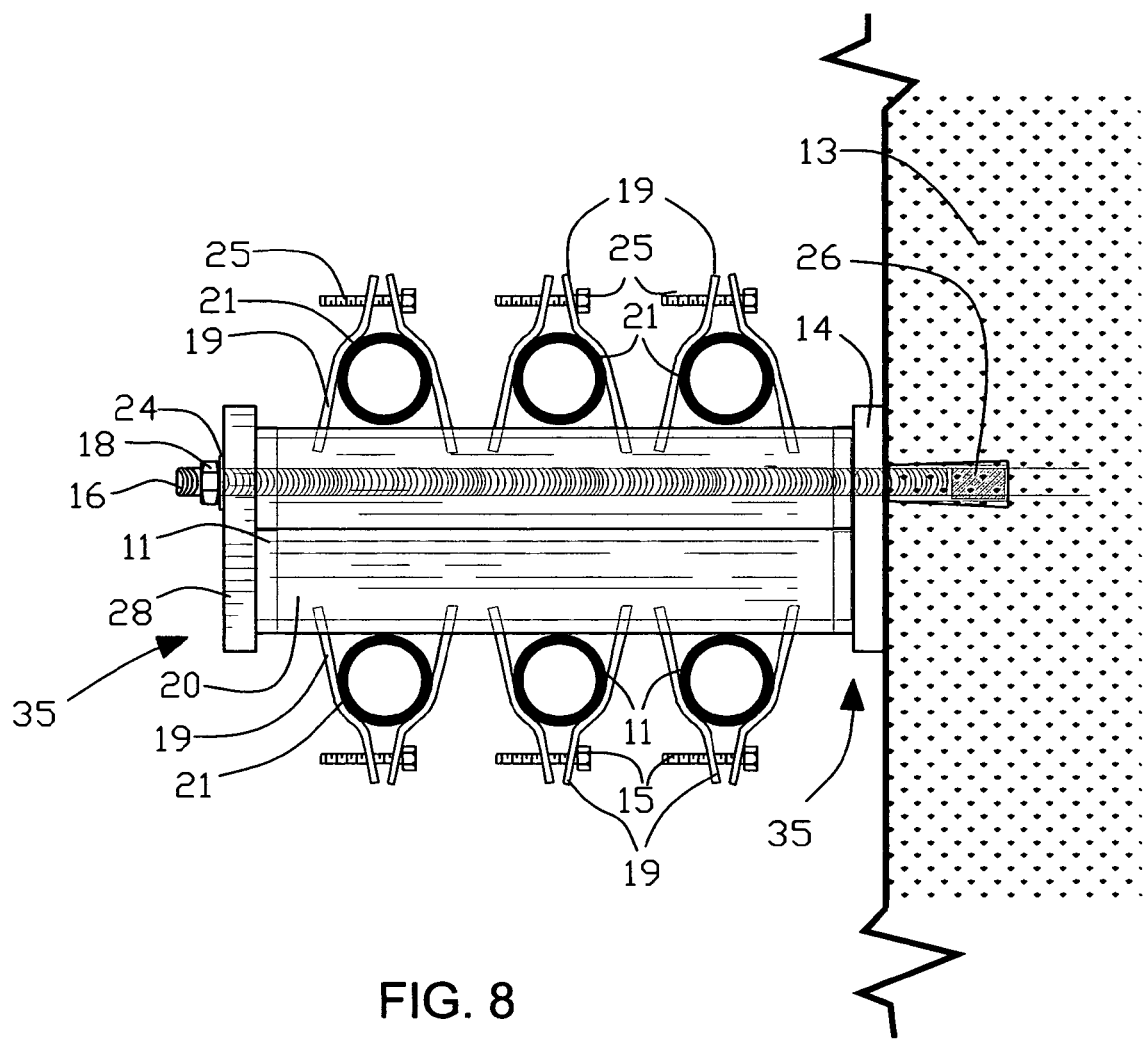
FIG. 8 is a front side elevation of the present invention depicting a double baseplate configuration and the attached piping associated with a typical installation.

FIG. 8 shows a front side elevation view of a cantilever embodiment of the present invention attached to a concrete wall surface. The clamping action is performed by tightening the threaded hex nut (18) on the threaded rod (16) as it extends transversely through the end clamp assembly (35) and strut and further through the opposite end clamp (4)(1) and is further threaded into the embedded concrete anchor (26). Each strut is spaced equally by the locating guide (11) attached to each baseplate (28). As shown in the figure, several pipes (21) can be attached to the top and bottom struts (20) utilizing strut pipe clamping devices (19) without interference from the transversely installed threaded rod (16), and held tightly in position by individual threaded fasteners (25). Although this figure shows all the pipes running in a parallel configuration, one strut could be optionally rotated ninety degrees to support piping in a parallel and perpendicular orientation. Additionally, FIG. 8 clearly shows the relationship between the transversely installed threaded rod (16) and the pipe clamping devices (19). The clearance between these two components is provided by the exact location of the aperture in the baseplate and is a fundamental object of the present invention.

Figure 9:
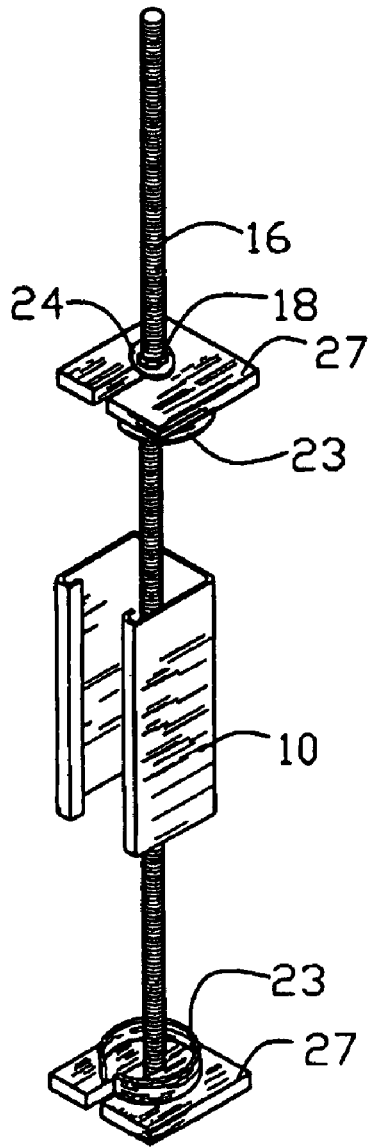
FIG. 9 is an exploded view of one embodiment of the present invention showing all of the components in a notched single strut configuration.

Another embodiment of the present invention is depicted in FIG. 9, which shows an exploded perspective view of a single strut (20) supported at opposite ends by an embodiment of a single strut type end clamp (30). The universal strut clamps (30) and strut (20) are held together by a single threaded rod suspension member (16) and suspended from a ceiling or roof building member to form a type of vertical trapeze. In comparison, by utilizing this embodiment to support piping, an equal number of pipes can be supported as the trapeze illustrated in FIG. 1, however, the present invention only requires a single point of attachment to the building structure. In addition, the depicted notched aperture (12) would further allow this embodiment to be attached as a complete assembly to a previously installed threaded rod. By using only one suspended attachment means, labor and material costs can be reduced in the installation, thus minimizing the total installed cost of the piping system.

Figure 10:
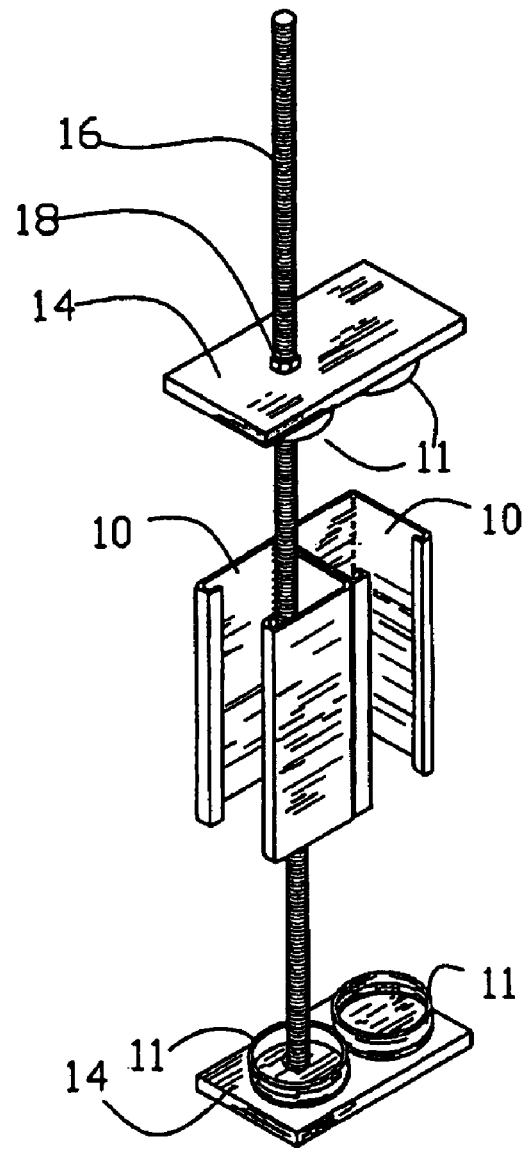
FIG. 10 is an exploded view of one embodiment of the present invention showing all of the components in a double strut configuration with a round aperture.

FIG. 10 further shows an embodiment of an exploded perspective view of two struts (20) supported from a single attachment means (16). This figure also depicts an embodiment which provides a method to support two individual struts (20) without the additional labor of welding or drilling. In addition, this embodiment further allows for one strut to be rotated 90 degrees to allow for clamping of perpendicular piping systems.

With respect to the above descriptions then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. As a device in combination with a threaded rod and nut, and a pre-formed metallic strut, a fastening and supporting notched baseplate device with a cooperating notched locating guide which is always used in pairs, for supporting conduit and similar piping components, comprising:
    a main baseplate body portion having an integral notched aperture in a predetermined location for securing said threaded rod longitudinally through said preformed metallic strut; and
    a locating guide so dimensioned on the first planar side of the baseplate cooperating with said integral aperture to provide a means of supporting the inside planar sides of the strut; and
    said locating guide is on the first planar side of said baseplate to form a unitary device; and
    a means in which the strut is supported and positioned by said locating guide and sandwiched between the first planar side of each baseplate and is compressed utilizing a single transversely installed threaded rod and nut, which is then further attached as an assembly to a building structure.

2. The device of claim 1 further comprising of said pair of individual baseplates with said notched apertures that cooperate with planar side opening of said strut to form a complete assembly which can cooperatively be placed over said longitudinal threaded rod.

* * * * *